(12) United States Patent
Kitazawa et al.

(10) Patent No.: US 12,496,786 B2
(45) Date of Patent: Dec. 16, 2025

(54) FORMING METHOD

(71) Applicant: MITSUBISHI HEAVY INDUSTRIES, LTD., Tokyo (JP)

(72) Inventors: Toshiki Kitazawa, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 110 days.

(21) Appl. No.: 17/794,152

(22) PCT Filed: Jun. 29, 2020

(86) PCT No.: PCT/JP2020/025592
§ 371 (c)(1),
(2) Date: Jul. 20, 2022

(87) PCT Pub. No.: WO2022/003800
PCT Pub. Date: Jan. 6, 2022

(65) Prior Publication Data
US 2023/0046204 A1    Feb. 16, 2023

(51) Int. Cl.
*B29C 53/04* (2006.01)
*B29C 43/14* (2006.01)
(Continued)

(52) U.S. Cl.
CPC .............. *B29C 70/46* (2013.01); *B29C 43/14* (2013.01); *B29C 70/525* (2013.01)

(58) Field of Classification Search
CPC ....... B29C 53/04; B29C 53/02; B29C 70/446; B29C 70/386; B29C 70/543; B29C 70/541; B29C 51/262; B29C 70/462
See application file for complete search history.

(56) References Cited

U.S. PATENT DOCUMENTS 2,280,359 A * 4/1942 Trudell .................. B21D 22/10
                                                     72/413
2,968,838 A * 1/1961 Hicks ..................... B28B 7/025
                                                     249/117
(Continued)

FOREIGN PATENT DOCUMENTS

JP         2003211447 A     7/2003
JP         2016502944 A     2/2016
(Continued)

OTHER PUBLICATIONS

Extended European Search Report of European Application No. 20942952.1 mailed Dec. 8, 2022; 7pp.
(Continued)

*Primary Examiner* — Matthew J Daniels
(74) *Attorney, Agent, or Firm* — HAUPTMAN HAM, LLP

(57) ABSTRACT

A method for forming a laminate by stacking sheet materials containing reinforcing fibers includes a fixation step wherein a first region of the laminate in the length direction is fixed to a forming mold having a curved part which comprises at least either a convex shape or a concave shape in a predetermined direction; forming steps wherein the laminate is formed along the surface shape of the forming mold by pressing a second region of the laminate in the length direction, the first region of said laminate having been fixed in the fixation step, against the forming mold by means of a forming jig; and an installation step wherein a holding jig, which holds a state where the laminate is pressed against the curved part, is installed onto the curved part, while maintaining the state where the laminate is pressed against the forming mold by means of the forming jig.

3 Claims, 11 Drawing Sheets

(51) Int. Cl.
  *B29C 70/46* (2006.01)
  *B29C 70/52* (2006.01)

(56) References Cited

U.S. PATENT DOCUMENTS

| | | | | |
|---|---|---|---|---|
| 3,115,678 | A * | 12/1963 | Keen | B29C 51/30 |
| | | | | 72/481.3 |
| 3,668,033 | A * | 6/1972 | Evans | B27D 1/08 |
| | | | | 156/499 |
| 3,686,051 | A * | 8/1972 | Samuel et al. | B62D 31/003 |
| | | | | 156/303.1 |
| 4,078,959 | A * | 3/1978 | Palfey | B29C 67/20 |
| | | | | 156/289 |
| 4,293,361 | A * | 10/1981 | Savio | B29C 70/386 |
| | | | | 156/481 |
| 4,415,399 | A * | 11/1983 | Geisinger | B29C 69/005 |
| | | | | 156/518 |
| 4,648,934 | A * | 3/1987 | Kiss | B27N 5/02 |
| | | | | 425/374 |
| 4,648,937 | A * | 3/1987 | Ogura | H01L 21/31116 |
| | | | | 257/E21.252 |
| 4,744,846 | A * | 5/1988 | Pflug | B32B 29/00 |
| | | | | 264/516 |
| 5,032,206 | A * | 7/1991 | Sigerist | B29C 63/0004 |
| | | | | 156/212 |
| 5,151,277 | A * | 9/1992 | Bernardon | B29C 70/443 |
| | | | | 249/161 |
| 5,192,560 | A * | 3/1993 | Umetsu | B29C 33/302 |
| | | | | 249/161 |
| 5,456,591 | A * | 10/1995 | Lo | A63B 49/10 |
| | | | | 156/196 |
| 6,114,012 | A * | 9/2000 | Amaoka | B29D 99/0007 |
| | | | | 244/119 |
| 6,146,122 | A * | 11/2000 | Kato | B29C 43/203 |
| | | | | 264/258 |
| 6,495,086 | B1 * | 12/2002 | Uytterhaeghe | B29C 70/541 |
| | | | | 264/322 |
| 8,556,618 | B2 | 10/2013 | Bergmann | |
| 10,710,320 | B2 * | 7/2020 | Mehling | B32B 37/10 |
| 10,894,344 | B2 * | 1/2021 | Barlag | B29C 43/56 |
| 11,524,468 | B2 * | 12/2022 | Ward | B29C 51/22 |
| 11,565,485 | B2 * | 1/2023 | Hopkins | B29C 70/54 |
| 2015/0174844 | A1 | 6/2015 | Brizon et al. | |
| 2015/0328843 | A1 | 11/2015 | Karb et al. | |
| 2016/0031166 | A1 * | 2/2016 | DesJardien | B29C 70/541 |
| | | | | 425/374 |
| 2016/0121560 | A1 * | 5/2016 | Lee | B29C 70/446 |
| | | | | 425/504 |
| 2016/0185030 | A1 | 6/2016 | Buckley et al. | |
| 2017/0021534 | A1 | 1/2017 | Chapman et al. | |
| 2017/0210054 | A1 | 7/2017 | Deck et al. | |
| 2020/0282666 | A1 * | 9/2020 | Lathrop | B29D 99/0003 |
| 2021/0237372 | A1 * | 8/2021 | Ward | B29C 51/42 |
| 2022/0024159 | A1 | 1/2022 | Shimono et al. | |

FOREIGN PATENT DOCUMENTS

| | | |
|---|---|---|
| JP | 2017140827 A | 8/2017 |
| JP | 2020093416 A | 6/2020 |
| WO | 2020121648 A1 | 6/2020 |

OTHER PUBLICATIONS

Office Action for Japanese Application No. 2022-533296 mailed Jan. 24, 2023; 6pp.

International Search Report for International Application No. PCT/JP2020/025592 mailed Sep. 24, 2020; 5pp.

\* cited by examiner

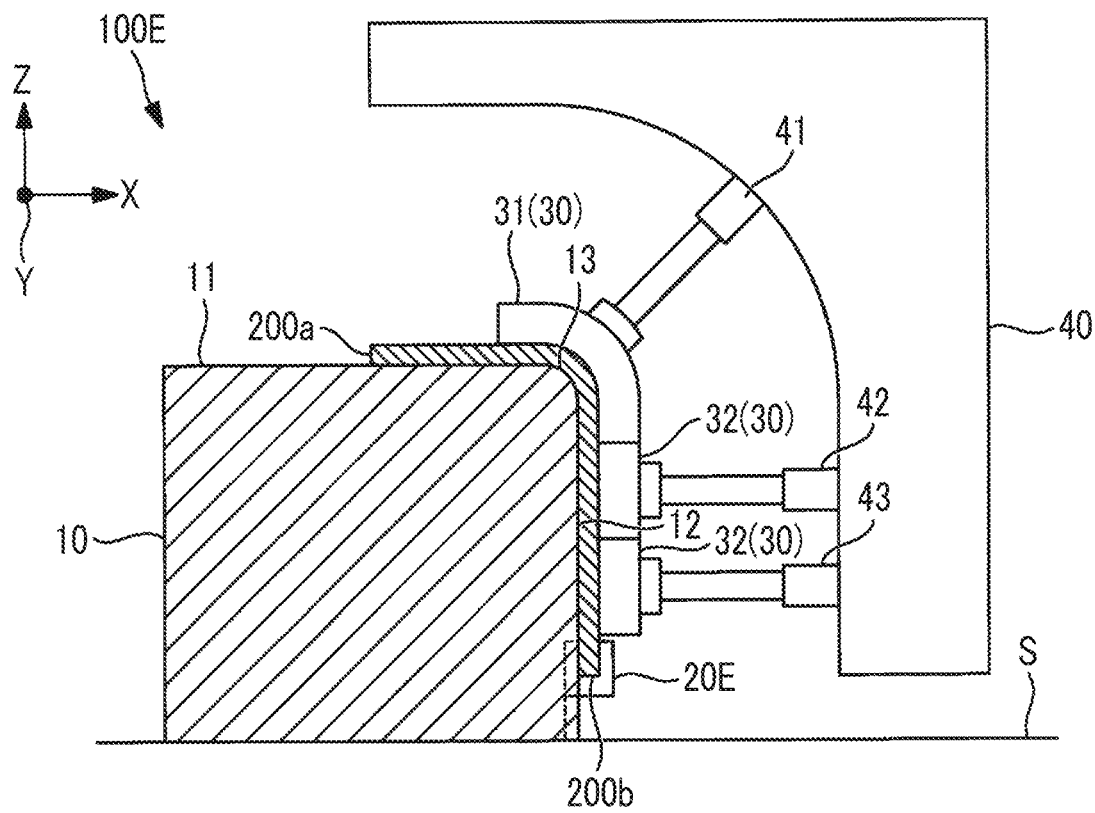

FORMING METHOD

RELATED APPLICATIONS

The present application is a National Phase of International Application Number PCT/JP2020/025592 filed Jun. 29, 2020.

TECHNICAL FIELD

The present disclosure relates to a forming method of forming a laminate obtained by laminating a plurality of sheet-shaped materials including reinforcing fibers and to a forming device.

BACKGROUND ART

A composite structural member of an aircraft has a certain cross-sectional shape, and as a method of manufacturing the composite structural member, there is known a method of pressing a laminate that is obtained by laminating a plurality of sheet-shaped materials including reinforcing fibers against a forming die so as to form the laminate into a target shape (for example, refer to PTL 1 and PTL 2).

Disclosed in PTL 1 is a technique in which forming a ply installed on a mandrel by pressing the ply against a forming surface of the mandrel by means of a bladder is repeated to form a composite material in which a plurality of plies are laminated on each other. Disclosed in PTL 2 is a technique in which a plate-shaped material installed on an upper surface of a forming tool is pressed against a side surface and a flange surface of the forming tool by means of a bladder so that the plate-shaped material is formed.

CITATION LIST

Patent Literature

[PTL 1] U.S. Unexamined Patent Application Publication No. 2017-0021534
[PTL 2] U.S. Pat. No. 8,556,618

SUMMARY OF INVENTION

Technical Problem

However, in the case of PTL 1, the bladder is withdrawn after the ply is pressed against the forming surface of the mandrel. Therefore, a portion of the ply from which the bladder is withdrawn may be separated from the forming surface and may be deformed into a shape different from the surface shape of the mandrel. Similarly, in the case of PTL 2, the bladder is withdrawn after the plate-shaped material is pressed against a forming surface of the forming tool and the plate-shaped material is cured thereafter. Therefore, a portion of the plate-shaped material from which the bladder is withdrawn may be separated from the forming surface and may be deformed into a shape different from the surface shape of the forming tool. Particularly, in a case where a concave portion is formed between a side surface and a flange surface as in the case of the forming tool of PTL 2, it is difficult to make a bladder fit in with the shape of the concave portion and to appropriately press a plate-shaped member and thus there is a probability that the plate-shaped member cannot be appropriately formed along the shape of the concave portion.

The present disclosure has been made in view of such circumstances and an object thereof is to provide a forming method and a forming device with which it is possible to reliably maintain a state where a laminate obtained by laminating a plurality of sheet-shaped materials including reinforcing fibers is formed along the surface shape of a forming die.

Solution to Problem

According to an aspect of the present disclosure, there is provided a forming method of forming a laminate that is obtained by laminating a plurality of sheet-shaped materials including reinforcing fibers, the forming method including: a fixation step of fixing a first region of the laminate in a longitudinal direction to a forming die that includes a curved portion having at least one of a concave shape and a convex shape along a predetermined direction; a forming step of forming the laminate along a surface shape of the forming die by pressing a second region of the laminate, of which the first region is fixed in the fixation step, in the longitudinal direction against the forming die by means of a forming jig; and an installation step of installing a holding jig on the curved portion in a state where the forming jig presses the laminate against the forming die, the holding jig maintaining a state where the laminate is pressed against the curved portion.

According to an aspect of the present disclosure, there is provided a forming device forming a laminate that is obtained by laminating a plurality of sheet-shaped materials including reinforcing fibers, the forming device including: a forming die that includes a curved portion having at least one of a concave shape and a convex shape along a predetermined direction and to which a first region of the laminate in a longitudinal direction is fixed; a forming jig that forms the laminate along a surface shape of the forming die by pressing a second region of the laminate, of which the first region is fixed to the forming die, in the longitudinal direction against the forming die; a holding jig that maintains a state where the laminate is pressed against the curved portion; and an installation mechanism that installs the holding jig on the curved portion in a state where the forming jig presses the laminate against the forming die.

Advantageous Effects of Invention

According to the aspects of the present disclosure, it is possible to provide a forming method and a forming device with which it is possible to reliably maintain a state where a laminate obtained by laminating a plurality of sheet-shaped materials including reinforcing fibers is formed along the surface shape of a forming die.

BRIEF DESCRIPTION OF DRAWINGS

FIG. 21 is a cross-sectional view that shows the forming device according to the sixth embodiment of the present disclosure and that shows a state where the forming of the laminate is finished.

DESCRIPTION OF EMBODIMENTS

First Embodiment

Figure 1:
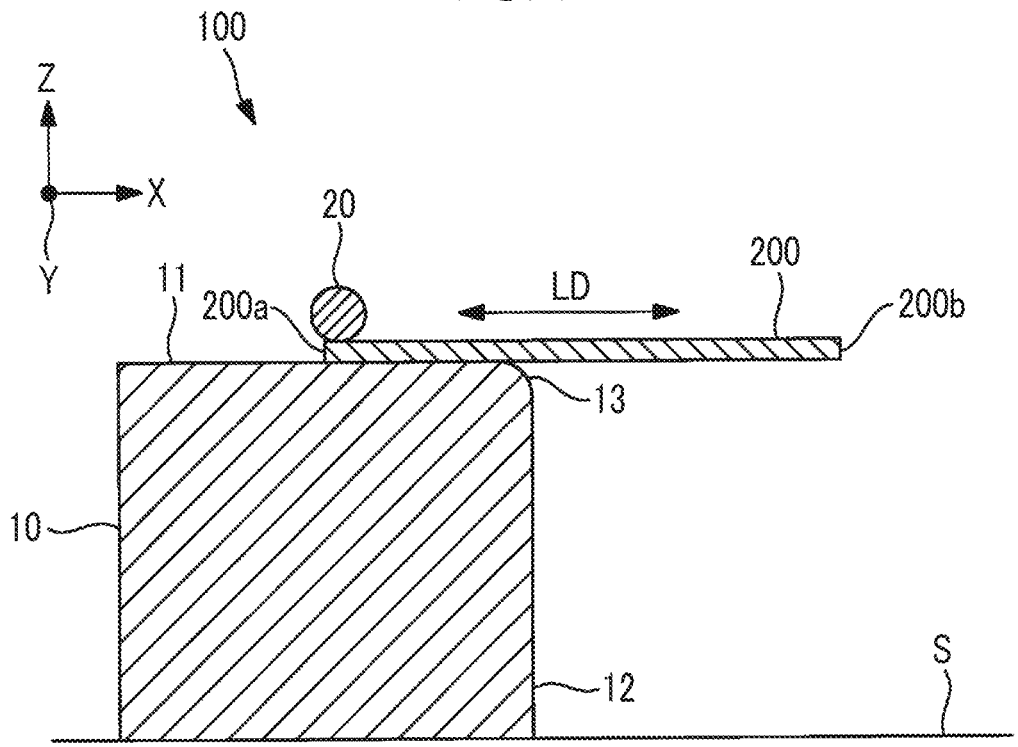
FIG. 1 is a cross-sectional view that shows a forming device according to a first embodiment of the present disclosure and that shows a state before the forming of a laminate.
Figure 2:
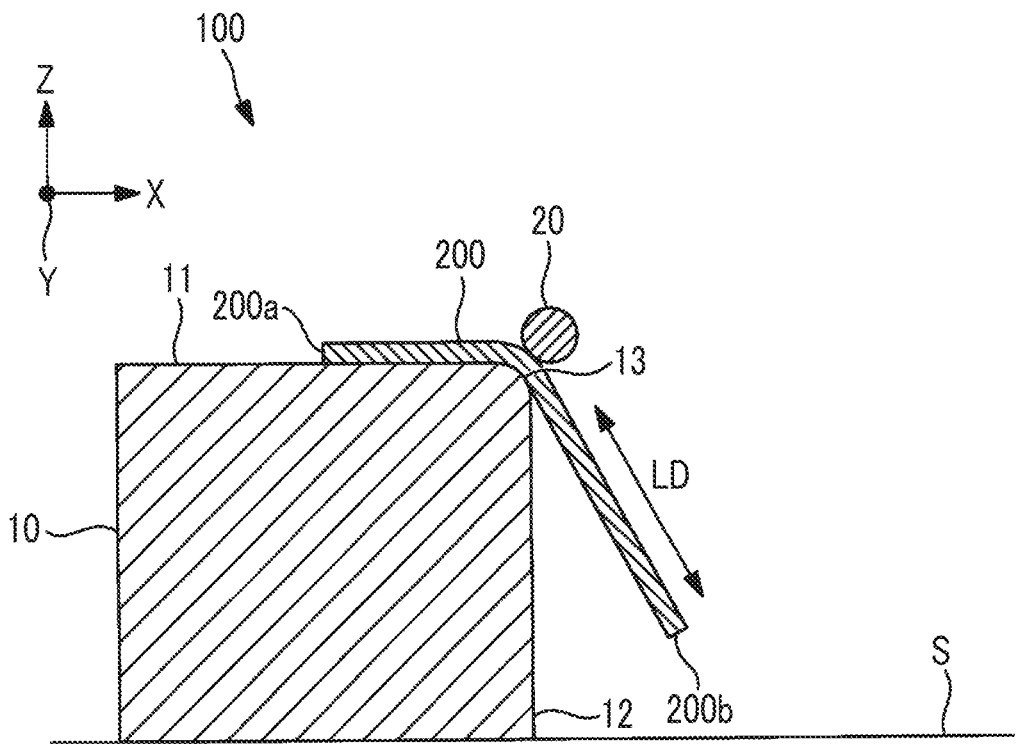
FIG. 2 is a cross-sectional view that shows the forming device according to the first embodiment of the present disclosure and that shows a state during the forming of the laminate.
Figure 3:
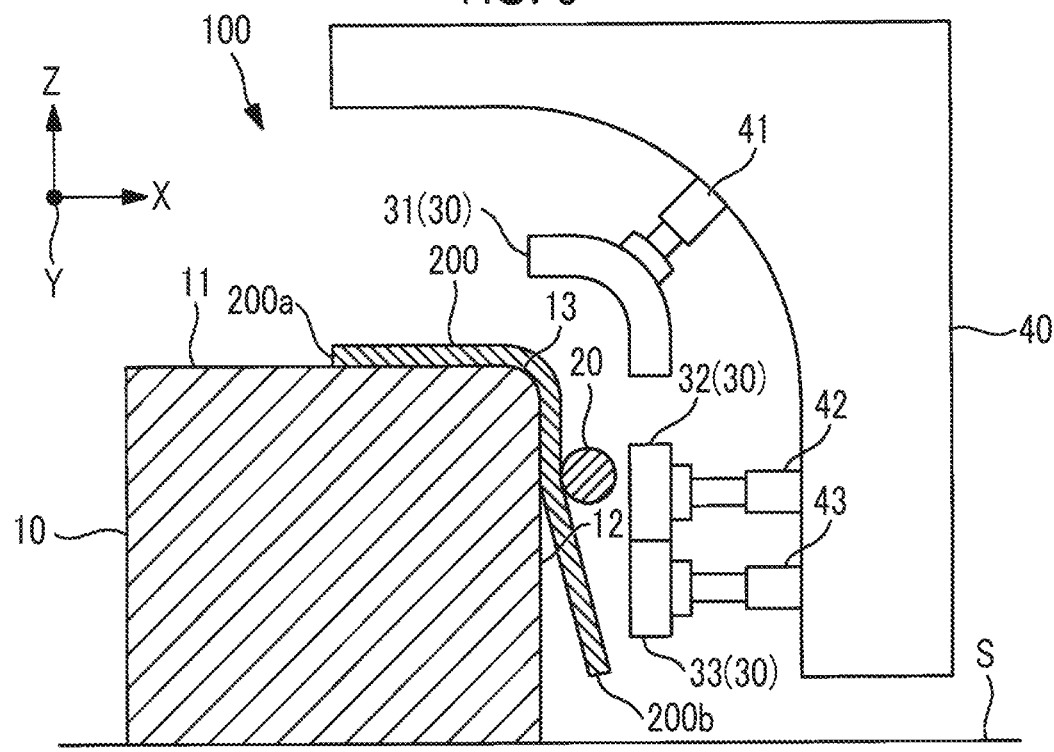
FIG. 3 is a cross-sectional view that shows the forming device according to the first embodiment of the present disclosure and that shows a state during the forming of the laminate.
Figure 4:
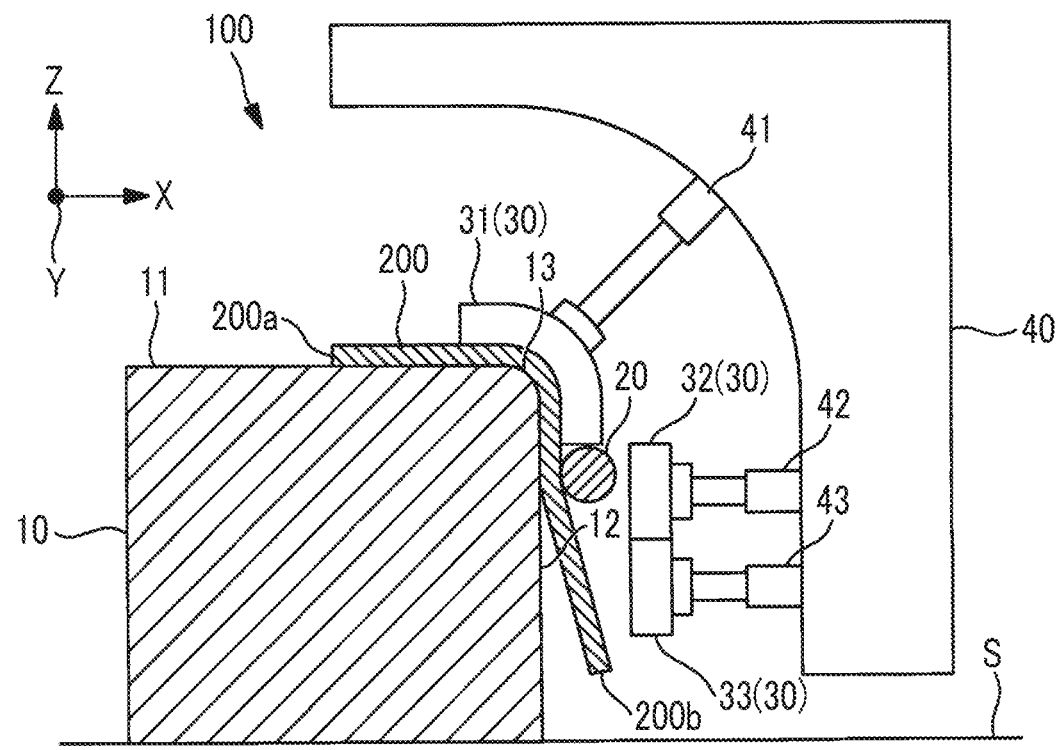
FIG. 4 is a cross-sectional view that shows the forming device according to the first embodiment of the present disclosure and that shows a state where a first holding jig is installed on a curved surface during the forming of the laminate.
Figure 5:
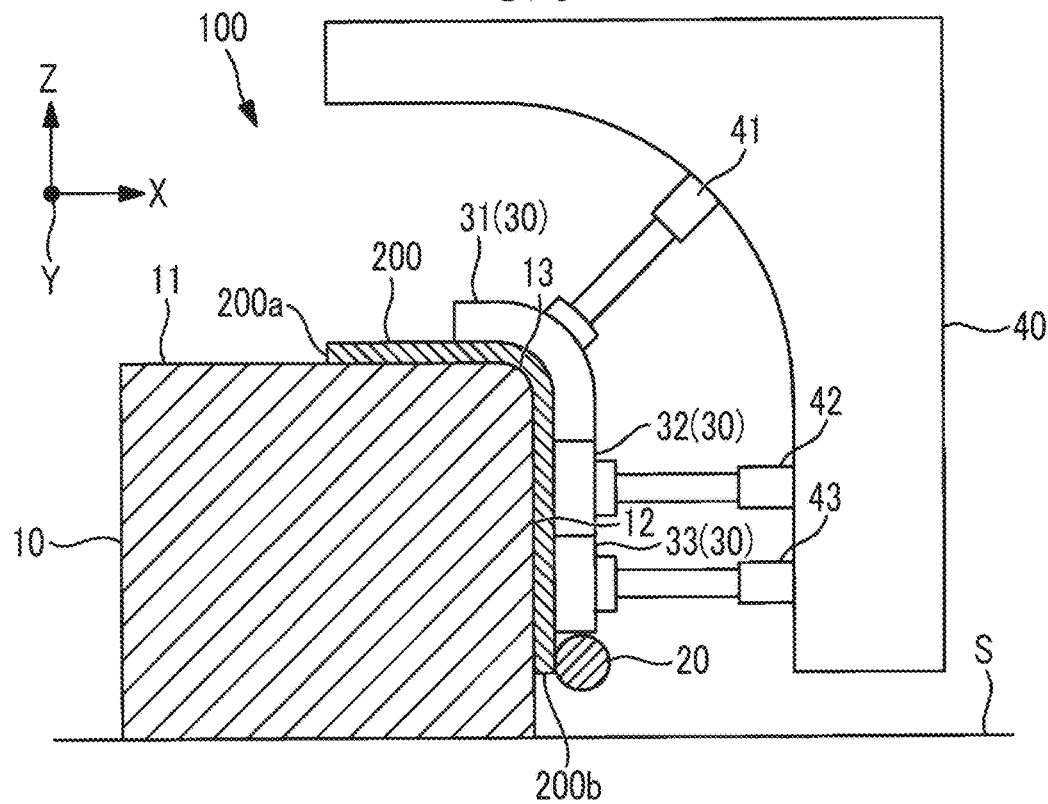
FIG. 5 is a cross-sectional view that shows the forming device according to the first embodiment of the present disclosure and that shows a state where the forming of the laminate is finished.

Hereinafter, a forming device 100 according to a first embodiment of the present disclosure and a forming method in which the forming device 100 is used will be described with reference to the drawings. FIGS. 1 to 4 are cross-sectional views showing the forming device 100 according to the present embodiment. FIG. 1 shows a state before the forming of a laminate 200. FIGS. 2 to 4 show a state during the forming of the laminate 200. FIG. 4 shows a state where a first holding jig 31 is installed on a curved surface 13 of a forming die 10. FIG. 5 shows a state where the forming of the laminate 200 is finished.

The forming device 100 of the present embodiment is a device that forms the laminate 200, which is obtained by laminating sheet-shaped materials including reinforcing fibers, along the surface shape of the forming die 10. The laminate 200 is obtained by laminating a plurality of sheet-shaped composite materials in a flat shape. The composite materials constituting the laminate 200 are sheet-shaped intermediate forming materials in which the reinforcing fibers and matrix resins attached thereto are semi-integrated with each other.

The reinforcing fibers included in the composite materials are, for example, carbon fibers, glass fibers, aramid fibers, or the like. As the matrix resins included in the composite materials, thermosetting resins or thermoplastic resins can be used. Examples of the thermosetting matrix resins include an epoxy resin, unsaturated polyester, vinyl ester, phenol, cyanate ester, and polyimide.

Examples of the thermoplastic matrix resins include polyetheretherketone (PEEK), polyethylene terephthalate (PET), polybutylene terephthalate (PBT), nylon 6 (PA6), nylon 66 (PA66), polyphenylene sulfide (PPS), polyetherimide (PEI), and polyetherketoneketone (PEKK).

In a case where thermoplastic resins are used as the matrix resins, the forming die 10 and a holding jig 30 which will be described later include heating mechanisms (not shown) that can heat the thermoplastic resins to a temperature equal to or higher than the softening point thereof. It is possible to form the laminate 200 including the thermoplastic resins along the surface shape of the forming die 10 by heating the thermoplastic resins to a temperature equal to or higher than the softening point by means of the heating mechanisms.

As the laminate 200, a laminate that is formed in a flat shape by laminating a plurality of sheet-shaped reinforcing fibers (dry sheets) including no matrix resin may be used. In a case where a plurality of sheet-shaped reinforcing fibers including no matrix resin are used, a resin transfer molding (RTM) method, in which the laminate 200 formed along the surface shape of the forming die 10 is disposed on a molding tool (not shown) and a resin material is injected into the molding tool and is caused to infiltrate the reinforcing fibers so that molding is performed, is used.

As shown in FIGS. 1 to 4, the forming device 100 of the present embodiment includes the forming die 10, a forming jig 20, the holding jig 30, and an installation mechanism 40. The forming device 100 shown in FIGS. 1 to 5 is disposed in a three-dimensional space. An X-axis, an Y-axis, and a Z-axis shown in FIGS. 1 to 5 are axes that intersect each other in the three-dimensional space. The X-axis is an axis extending along an installation surface S on which the forming die 10 is installed, and the Z-axis is an axis extending in a direction orthogonal to the installation surface S on which the forming die 10 is installed. The Y-axis is an axis orthogonal to both of the X-axis and the Z-axis and is an axis extending along a paper surface depth direction of FIGS. 1 to 5.

The forming die 10 is a block-shaped die having a surface shape for forming the laminate 200 and is formed of a metallic material, for example. As the surface shape for forming the laminate 200, the forming die 10 includes an upper surface 11, a side surface 12, and a curved surface (curved portion) 13. It will be assumed that the cross-sectional shape of the forming die 10 of the present embodiment is the same for any position in a direction along the Y-axis. However, other configurations may also be adopted. The forming die 10 may have a shape including at least one of a concave shape or a convex shape along the Y-axis, for example.

The upper surface 11 of the forming die 10 is a surface extending flat along the X-axis. The side surface 12 of the forming die 10 is a surface extending flat along the Z-axis. The curved surface 13 is a surface that connects the upper surface 11 and the side surface 12 to each other and that has an arc-like shape in which the normal direction of the surface gradually changes toward the side surface 12 from the upper surface 11 along the X-axis with a transition from a surface extending along the X-axis to a surface extending along the Z-axis. The curved surface 13 is a portion having a convex shape along an X-axis direction (predetermined direction).

Regarding the forming die 10, the upper surface 11 extends flat along the X-axis, the side surface 12 extends flat along the Z-axis, and the curved surface 13 is an arc-like surface connecting the upper surface 11 and the side surface 12. However, other configurations may also be adopted. For example, the upper surface 11 may be a surface extending in a direction different from the X-axis and may be a surface that is not flat. In addition, the side surface 12 may be a surface extending in a direction different from the Z-axis and may be a surface that is not flat. In addition, the curved surface 13 may have any convex shape different from an arc-like shape.

The forming jig 20 is a jig that presses the other end (second region) 200b of the laminate 200, of which the one end (first region) 200a is fixed to the forming die 10, in a longitudinal direction LD against the forming die 10 so as to form the laminate 200 along the surface shape of the forming die 10. The forming jig 20 of the present embodiment is a member that is formed in a rod-like shape extending in a width direction (Y-axis direction) of the laminate 200 and that has a circular cross section. The forming jig 20 forms the laminate 200 along the surface shape of the forming die 10 by continuously moving from the one end 200a to the other end 200b of the laminate 200 while pressing the laminate 200 against a surface of the forming die 10.

As described above, the forming die 10 may have a shape including at least one of a concave shape or a convex shape along the Y-axis, for example. In this case, it is preferable that the forming jig 20 has a shape divided into a plurality of parts along the width direction (Y-axis direction) of the laminate 200 instead of being a single rod-shaped member. By being divided into a plurality of parts along the width direction of the laminate 200, the forming jig 20 becomes able to be disposed along a shape at each position in the width direction. Accordingly, it is possible to appropriately form the laminate along the shape of the forming die 10 in the Y-axis direction in comparison with the case of a single rod-shaped member.

As shown in FIGS. 3 to 5, the holding jig 30 is a member that maintains a state where the laminate 200 that is formed by the forming jig 20 along the surface shape of the forming die 10 is pressed against the upper surface 11, the side surface 12, and the curved surface 13. The holding jig 30 includes a first holding jig 31, a second holding jig 32, and a third holding jig 33.

The shape of a surface of the holding jig 30 that comes into contact with the laminate 200 is a shape that coincides with the shape of an outer peripheral surface of the laminate 200 formed along the surface shape of the forming die 10. The shape of a surface of the first holding jig 31 that comes into contact with the laminate 200 is a shape that corresponds to the curved surface 13 of the forming die 10. The shapes of surfaces of the second holding jig 32 and the third holding jig 33 that come into contact with the laminate 200 are shapes that correspond to the side surface 12 of the forming die 10.

Although the holding jig 30 shown in FIGS. 3 to 5 includes the three holding jigs which are the first holding jig 31, the second holding jig 32, and the third holding jig 33, other configurations may also be adopted. For example, the first holding jig 31 corresponding to the curved surface 13 of the forming die 10 may be a combination of a plurality of holding jigs. In addition, for example, each of the second holding jig 32 and the third holding jig 33 having shapes corresponding to the side surface 12 of the forming die 10 may be a single holding jig or a combination of three or more holding jigs.

As shown in FIGS. 3 to 5, the installation mechanism 40 is a mechanism that installs the holding jig 30 on the laminate 200 in a state where the laminate 200 is pressed against the forming die 10 by the forming jig 20. The installation mechanism 40 includes a first installation unit 41, a second installation unit 42, and a third installation unit 43. The first installation unit 41 installs the first holding jig 31 on the curved surface 13 of the forming die 10. The second installation unit 42 installs the second holding jig 32 on the side surface 12 of the forming die 10. The third installation unit 43 installs the third holding jig 33 on the side surface 12 of the forming die 10.

Figure 6:
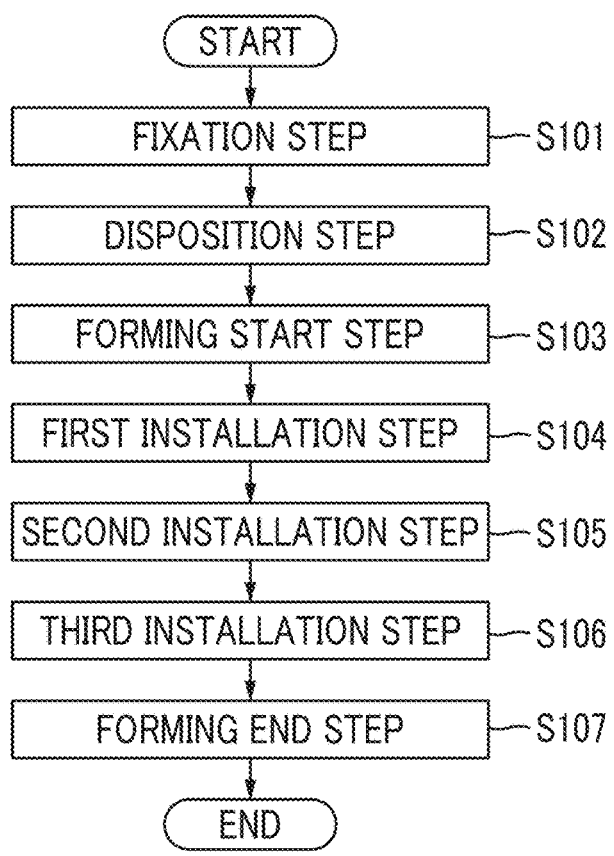
FIG. 6 is a flowchart showing a forming method according to the first embodiment of the present disclosure.

Next, a forming method performed by the forming device 100 according to the present embodiment will be described with reference to FIG. 6. FIG. 6 is a flowchart showing the forming method according to the present embodiment.

In step S101 (fixation step), the one end 200a of the laminate 200 in the longitudinal direction LD is fixed to the forming die 10. For example, the laminate 200 is fixed to the forming die 10 with the one end 200a sandwiched by a clamp (not shown) attached to the forming die 10.

In step S102 (disposition step), the rod-shaped forming jig 20 that extends in the width direction of the laminate 200 is disposed to come into contact with the one end 200a of the laminate 200 that is fixed to the forming die 10 in step S101. When the forming jig 20 is disposed, a state as shown in FIG. 1 is achieved.

In step S103 (forming start step), the other end 200b of the laminate 200 is pressed against the forming die 10 by the forming jig 20 so that a forming step of forming the laminate 200 along the surface shape of the forming die 10 is started. The forming step is a series of steps of moving the forming jig 20 along the longitudinal direction LD from the one end 200a to the other end 200b of the laminate 200 in the longitudinal direction LD. In the forming step, the forming jig 20 is moved from the one end 200a to the other end 200b in the longitudinal direction LD in a state where the laminate 200 is pressed against the forming die 10 by the forming jig 20. The forming jig 20 moves while maintaining a state where the forming jig 20 is in contact with the laminate 200 and the laminate 200 is pressed against the forming die 10.

When the forming step is started in step S103, the forming jig 20 is moved along the X-axis from the one end 200a of the laminate 200 to the curved surface 13 of the forming die 10 by means of a forming mechanism (not shown). When the forming jig 20 reaches the curved surface 13, a state as shown in FIG. 2 is achieved. When the forming jig 20 passes over the curved surface 13 and reaches the side surface 12, a state as shown in FIG. 3 is achieved.

In step S104 (first installation step), the first holding jig 31 that maintains a state where the laminate 200 is pressed against the curved surface 13 is installed on the curved surface 13 as the forming jig 20 passes over the curved surface 13 and reaches the side surface 12. After the forming jig 20 passes over the curved surface 13, the installation mechanism 40 moves to a position close to the forming die 10 and a state as shown in FIG. 3 is achieved. The installation mechanism 40 may be fixed at a predetermined position with respect to the forming die 10.

Thereafter, by means of the first installation unit 41, the installation mechanism 40 moves the first holding jig 31 to a position (position shown in FIG. 4) close to the forming die 10 from a position (position shown in FIG. 3) separated from the forming die 10 and installs the first holding jig 31 on a position at which the first holding jig 31 comes into contact with the laminate 200 formed along the shape of the curved surface 13.

As shown in FIG. 4, when the first installation unit 41 installs the first holding jig 31 on the curved surface 13, the forming jig 20 is in a state of pressing the laminate 200 against the forming die 10. Since the forming jig 20 is not withdrawn from the laminate 200 when the first holding jig 31 is installed on the curved surface 13, the laminate 200 is not deformed into a shape different from the surface shape of the forming die 10.

In step S105 (second installation step), the second holding jig 32 that maintains a state where the laminate 200 is pressed against the side surface 12 is installed on the side surface 12 as the forming jig 20 passes over a position on the side surface 12 that faces the second holding jig 32. By means of the second installation unit 42, the installation mechanism 40 moves the second holding jig 32 to a position (position shown in FIG. 5) close to the forming die 10 from a position (position shown in FIG. 4) separated from the forming die 10 and installs the second holding jig 32 on a position at which the second holding jig 32 comes into contact with the laminate 200 formed along the shape of the side surface 12.

In step S106 (third installation step), the third holding jig 33 that maintains a state where the laminate 200 is pressed against the side surface 12 is installed on the side surface 12 as the forming jig 20 passes over a position on the side surface 12 that faces the third holding jig 33. By means of the third installation unit 43, the installation mechanism 40 moves the third holding jig 33 to a position (position shown in FIG. 5) close to the forming die 10 from a position (position shown in FIG. 4) separated from the forming die 10 and installs the third holding jig 33 on a position at which the third holding jig 33 comes into contact with the laminate 200 formed along the shape of the side surface 12.

In step S107 (forming end step), when the forming jig 20 is further moved toward the other end 200b of the laminate 200 along the Z-axis by the forming mechanism, the forming jig 20 reaches the other end 200b of the laminate 200. When the forming jig 20 reaches the other end 200b of the laminate 200, a state as shown in FIG. 5 is achieved and each step of the forming method shown in FIG. 6 ends.

According to the forming method of the present embodiment, the one end 200a of the laminate 200 in the longitudinal direction LD is fixed to the forming die 10 including the curved surface 13 having a convex shape and the other end 200b of the laminate 200 in the longitudinal direction LD is pressed against the forming die 10 so that the laminate 200 is formed along the surface shape of the forming die 10. The first holding jig 31 is installed on the curved surface 13 of the laminate 200 formed along the surface shape of the forming die 10 in a state where the laminate 200 is pressed against the forming die 10 by the forming jig 20.

Since the forming jig 20 is in a state of pressing the laminate 200 against the forming die 10 at the time of installation of the first holding jig 31, the laminate 200 is not deformed into a shape different from the surface shape of the forming die 10 with the forming jig 20 withdrawn from the laminate 200. Therefore, it is possible to reliably maintain a state where the laminate 200, which is obtained by laminating a plurality of sheet-shaped materials including reinforcing fibers, is formed along the surface shape of the forming die 10.

Second Embodiment

Next, a forming device 100A according to a second embodiment of the present disclosure and a forming method in which the forming device 100A is used will be described with reference to the drawings.

The present embodiment is a modification example of the first embodiment, is the same as the first embodiment except for a case particularly described below, and the description thereof will be omitted below.

The forming die 10 of the first embodiment includes the curved surface 13 which is a portion having a convex shape along the X-axis direction. In contrast, a forming die 10A of the present embodiment includes a curved surface 16 which is a portion having a concave shape along the X-axis direction.

Figure 7:
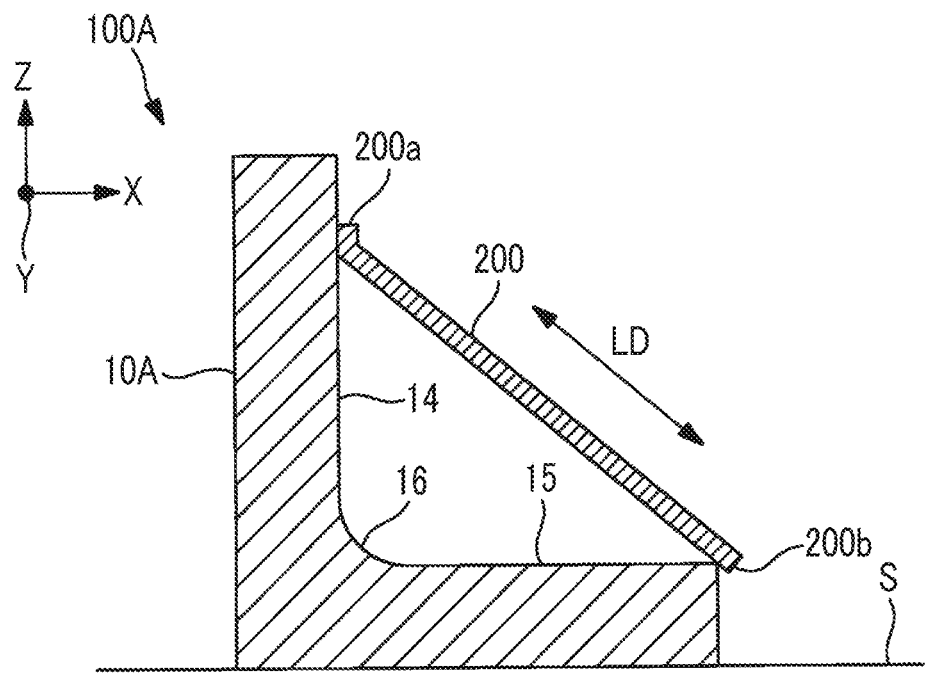
FIG. 7 is a cross-sectional view that shows a forming device according to a second embodiment of the present disclosure and that shows a state before the forming of a laminate.
Figure 8:
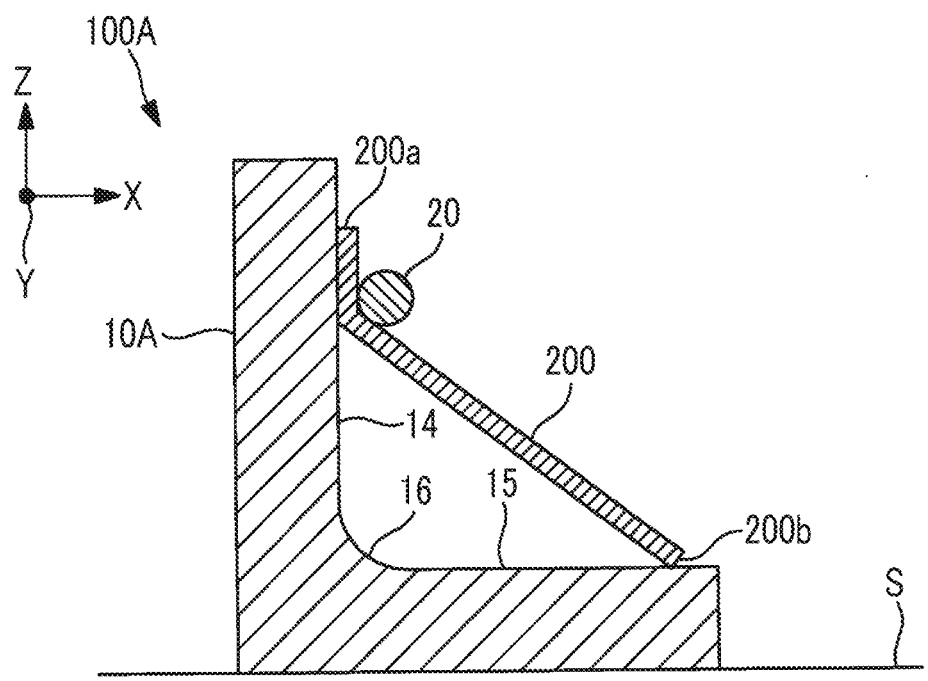
FIG. 8 is a cross-sectional view that shows the forming device according to the second embodiment of the present disclosure and that shows a state during the forming of the laminate.
Figure 9:
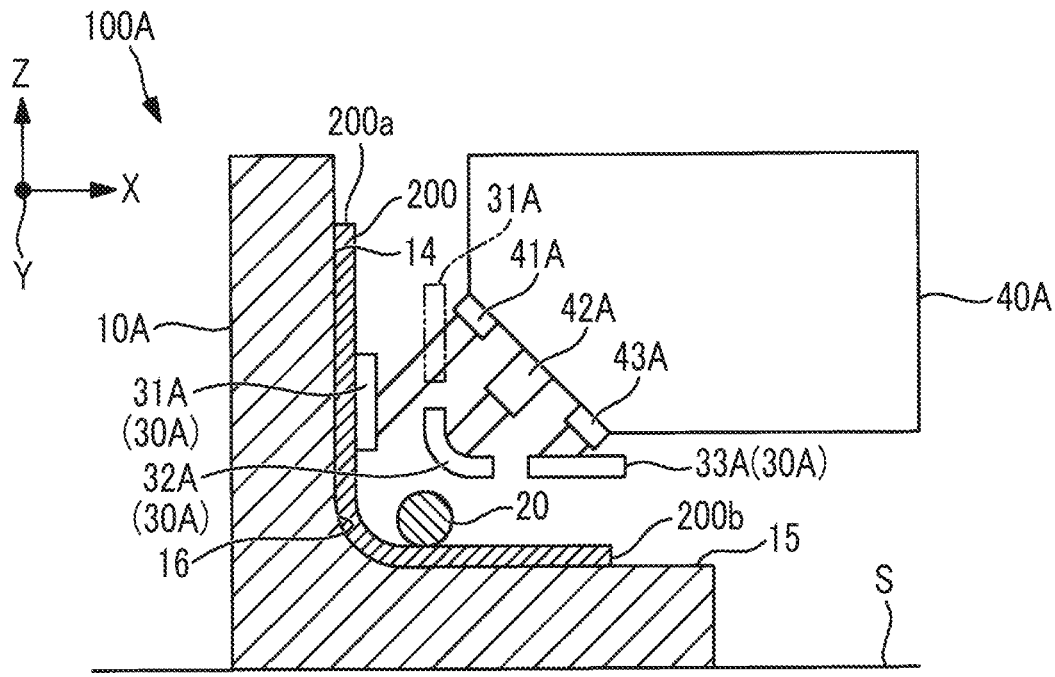
FIG. 9 is a cross-sectional view that shows the forming device according to the second embodiment of the present disclosure and that shows a state during the forming of the laminate.
Figure 10:
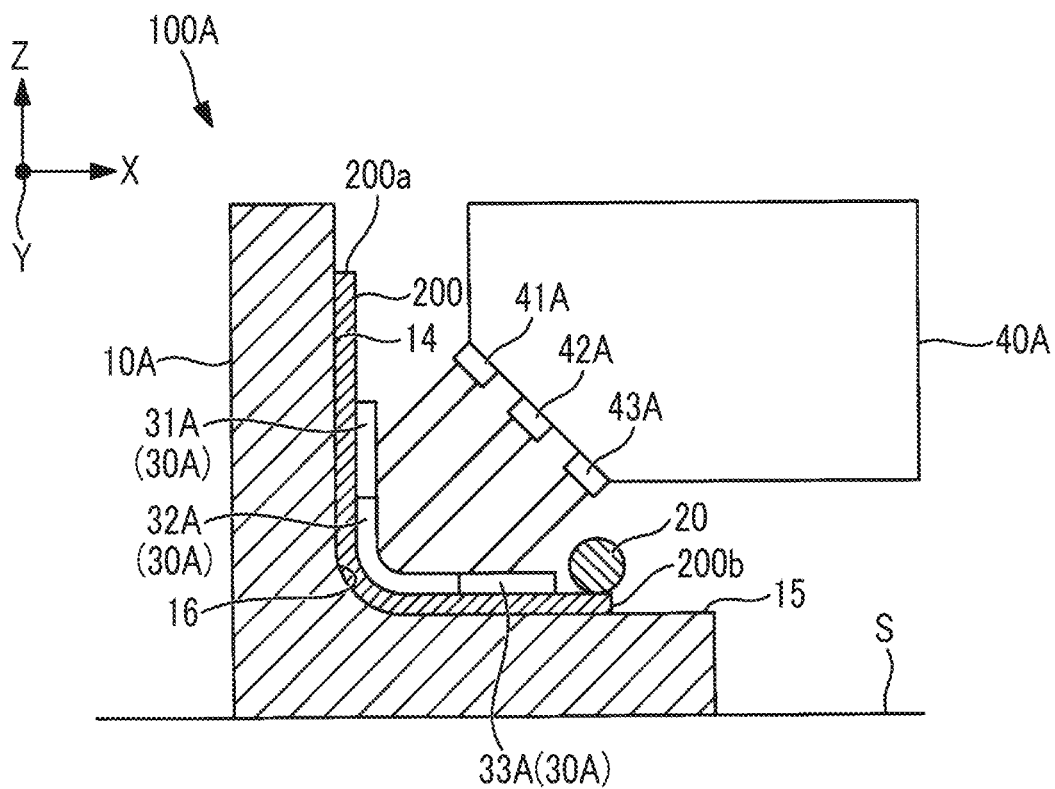
FIG. 10 is a cross-sectional view that shows the forming device according to the second embodiment of the present disclosure and that shows a state where the forming of the laminate is finished.

FIGS. 7 to 10 are cross-sectional views showing the forming device 100A according to the present embodiment. FIG. 7 shows a state before the forming of a laminate 200. FIGS. 8 to 9 show a state during the forming of the laminate 200. FIG. 10 shows a state where the forming of the laminate 200 is finished.

As the surface shape for forming the laminate 200, the forming die 10A of the present embodiment includes a vertical surface 14, a horizontal surface 15, and the curved surface (curved portion) 16. It will be assumed that the cross-sectional shape of the forming die 10A of the present embodiment is the same for any position in a direction along the Y-axis. However, other configurations may also be adopted. The forming die 10A may have a shape including at least one of a concave shape or a convex shape along the Y-axis, for example.

The vertical surface 14 of the forming die 10A is a surface extending flat along the Z-axis. The horizontal surface 15 of the forming die 10A is a surface extending flat along the X-axis. The curved surface 16 is a surface that connects the vertical surface 14 and the horizontal surface 15 to each other and that has an arc-like shape in which the normal direction of the surface gradually changes toward the horizontal surface 15 from the vertical surface 14 along the X-axis with a transition from a surface extending along the Z-axis to a surface extending along the X-axis. The curved surface 16 is a portion having a concave shape along an X-axis direction (predetermined direction).

Regarding the forming die 10A, the vertical surface 14 extends flat along the Z-axis, the horizontal surface 15 extends flat along the X-axis, and the curved surface 16 is an arc-like surface connecting the vertical surface 14 and the horizontal surface 15. However, other configurations may also be adopted. For example, the vertical surface 14 may be a surface extending in a direction different from the Z-axis and may be a surface that is not flat. In addition, the horizontal surface 15 may be a surface extending in a direction different from the X-axis and may be a surface that is not flat. In addition, the curved surface 16 may have any concave shape different from an arc-like shape.

As shown in FIGS. 9 and 10, a holding jig 30A is a member that maintains a state where the laminate 200 that is formed by the forming jig 20 along the surface shape of the forming die 10A is pressed against the vertical surface 14, the horizontal surface 15, and the curved surface 16. The holding jig 30A includes a first holding jig 31A, a second holding jig 32A, and a third holding jig 33A.

The shape of a surface of the holding jig 30A that comes into contact with the laminate 200 is a shape that coincides with the shape of an outer peripheral surface of the laminate 200 formed along the surface shape of the forming die 10A. The shape of a surface of the first holding jig 31A that comes into contact with the laminate 200 is a shape that corresponds to the vertical surface 14 of the forming die 10A. The shape of a surface of the second holding jig 32A that comes into contact with the laminate 200 is a shape that corresponds to the curved surface 16 of the forming die 10A. The shape of a surface of the third holding jig 33A that comes into contact with the laminate 200 is a shape that corresponds to the horizontal surface 15 of the forming die 10A.

Although the holding jig 30A shown in FIGS. 9 and 10 includes the three holding jigs which are the first holding jig 31A, the second holding jig 32A, and the third holding jig 33A, other configurations may also be adopted. For example, at least one of the first holding jig 31A, the second holding jig 32A, and the third holding jig 33A may be a combination of two or more holding jigs.

As shown in FIGS. 9 and 10, an installation mechanism 40A is a mechanism that installs the holding jig 30A on the laminate 200 in a state where the laminate 200 is pressed against the forming die 10A by the forming jig 20. The installation mechanism 40A includes a first installation unit 41A, a second installation unit 42A, and a third installation unit 43A. The first installation unit 41A installs the first holding jig 31A on the vertical surface 14 of the forming die 10A. The second installation unit 42A installs the second holding jig 32A on the curved surface 16 of the forming die 10A. The third installation unit 43A installs the third holding jig 33A on the horizontal surface 15 of the forming die 10A.

Next, a forming method performed by the forming device 100A according to the present embodiment will be described. The forming method of the present embodiment is a modification example of the forming method of the first embodiment shown in FIG. 6. In step S101 (fixation step) shown in FIG. 6, the forming device 100A enters a state as shown in FIG. 7. In step S102 (disposition step) shown in FIG. 6, the forming device 100A enters a state as shown in FIG. 8. In step S104 (first installation step) shown in FIG. 6, the forming device 100A enters a state as shown in FIG. 9. In step S107 (forming end step) shown in FIG. 6, the forming device 100A enters a state as shown in FIG. 10.

In the fixation step as shown in FIG. 7, the one end 200a of the laminate 200 in the longitudinal direction LD is fixed to the vertical surface 14 of the forming die 10A. For example, the laminate 200 is fixed to the vertical surface 14 of the forming die 10A with the one end 200a sandwiched by a clamp (not shown) attached to the forming die 10A.

In the disposition step shown in FIG. 8, the rod-shaped forming jig 20 that extends in the width direction of the laminate 200 is disposed to come into contact with the one end 200a of the laminate 200 that is fixed to the forming die 10A. When the forming jig 20 is disposed, a state as shown in FIG. 8 is achieved.

When the state as shown in FIG. 8 is achieved, the other end 200b of the laminate 200 is pressed against the forming die 10A by the forming jig 20 so that a forming step of forming the laminate 200 along the surface shape of the forming die 10A is started. The forming step is a series of steps of moving the forming jig 20 along the longitudinal direction LD from the one end 200a to the other end 200b of the laminate 200 in the longitudinal direction LD. In the forming step, the forming jig 20 is moved from the one end 200a to the other end 200b in the longitudinal direction LD in a state where the laminate 200 is pressed against the forming die 10A by the forming jig 20. The forming jig 20 moves while maintaining a state where the forming jig 20 is in contact with the laminate 200 and the laminate 200 is pressed against the forming die 10A.

When the forming step is started, the forming jig 20 is moved along the Z-axis from the one end 200a of the laminate 200 to the curved surface 16 of the forming die 10A by means of a forming mechanism (not shown). When the forming jig 20 passes over the curved surface 16 and reaches the horizontal surface 15, a state as shown in FIG. 9 is achieved.

In step S104 (first installation step) in FIG. 6, the first holding jig 31A that maintains a state where the laminate 200 is pressed against the vertical surface 14 is installed on the vertical surface 14 as the forming jig 20 passes over the vertical surface 14 and reaches the curved surface 16. Before the forming jig 20 reaches the curved surface 16, the installation mechanism 40A moves to a position close to the forming die 10A and a state as shown in FIG. 9 is achieved. The installation mechanism 40A may be fixed at a predetermined position with respect to the forming die 10A.

Thereafter, by means of the first installation unit 41A, the installation mechanism 40A moves the first holding jig 31A to a position (position represented by solid line in FIG. 9) close to the forming die 10A from a position (position represented by two-dot chain line in FIG. 9) separated from the forming die 10A and installs the first holding jig 31A on a position at which the first holding jig 31A comes into contact with the laminate 200 formed along the shape of the vertical surface 14.

In step S105 (second installation step) in FIG. 6, the second holding jig 32A that maintains a state where the laminate 200 is pressed against the curved surface 16 is installed on the curved surface 16 as the forming jig 20 passes over the curved surface 16 and reaches the horizontal surface 15. By means of the second installation unit 42A, the installation mechanism 40A moves the second holding jig 32A to a position (position shown in FIG. 10) close to the forming die 10A from a position (position shown in FIG. 9) separated from the forming die 10A and installs the second holding jig 32A on a position at which the second holding jig 32A comes into contact with the laminate 200 formed along the shape of the curved surface 16.

As shown in FIG. 10, when the second installation unit 42A installs the second holding jig 32A on the curved surface 16, the forming jig 20 is in a state of pressing the laminate 200 against the forming die 10A. Since the forming jig 20 is not withdrawn from the laminate 200 when the second holding jig 32A is installed on the curved surface 16, the laminate 200 is not deformed into a shape different from the surface shape of the forming die 10A.

In step S106 (third installation step) in FIG. 6, the third holding jig 33A that maintains a state where the laminate 200 is pressed against the horizontal surface 15 is installed on the horizontal surface 15 as the forming jig 20 passes over a position on the horizontal surface 15 that faces the third holding jig 33A. By means of the third installation unit 43A, the installation mechanism 40A moves the third holding jig 33A to a position (position shown in FIG. 10) close to the forming die 10A from a position (position shown in FIG. 9) separated from the forming die 10A and installs the third holding jig 33A on a position at which the third holding jig 33A comes into contact with the laminate 200 formed along the shape of the horizontal surface 15.

When the forming jig 20 is further moved toward the other end 200b of the laminate 200 along the X-axis by the forming mechanism, the forming jig 20 reaches the other end 200b of the laminate 200. When the forming jig 20 reaches the other end 200b of the laminate 200, a state as shown in FIG. 10 is achieved and each step of the forming method of the present embodiment ends.

According to the forming method of the present embodiment, the one end 200a of the laminate 200 in the longitudinal direction LD is fixed to the forming die 10A including the curved surface 16 having a concave shape and the other end 200b of the laminate 200 in the longitudinal direction LD is pressed against the forming die 10A so that the laminate 200 is formed along the surface shape of the forming die 10A. The second holding jig 32A is installed on the concave curved surface 16 of the forming die 10A with the laminate 200 interposed therebetween, the laminate 200 being maintained in a state of being pressed against the forming die 10A by the forming jig 20.

Since the forming jig 20 is in a state of pressing the laminate 200 against the forming die 10A at the time of installation of the second holding jig 32A, the laminate 200 is not deformed into a shape different from the surface shape of the forming die 10A with the forming jig 20 withdrawn from the laminate 200. Therefore, it is possible to reliably maintain a state where the laminate 200, which is obtained by laminating a plurality of sheet-shaped materials including reinforcing fibers, is formed along the surface shape of the forming die 10A.

Third Embodiment

Next, a forming device 100B according to a third embodiment of the present disclosure and a forming method in which the forming device 100B is used will be described with reference to the drawings.

The present embodiment is a modification example of the first embodiment, is the same as the first embodiment except for a case particularly described below, and the description thereof will be omitted below.

In the first embodiment, the holding jig 30 is moved by the installation mechanism 40 to a position close to the forming die 10 from a position separated from the forming die 10. In contrast, in the present embodiment, a holding jig 30B is unwound from a roller 31B as the forming jig 20 moves.

Figure 11:
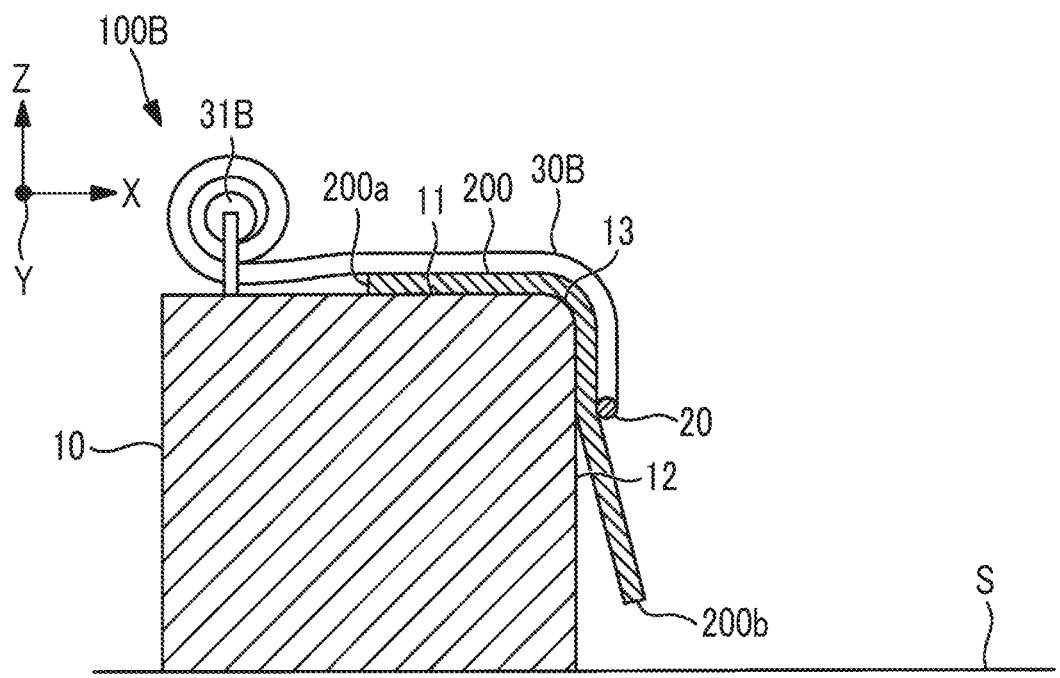
FIG. 11 is a cross-sectional view that shows a forming device according to a third embodiment of the present disclosure and that shows a state during the forming of a laminate.
Figure 12:
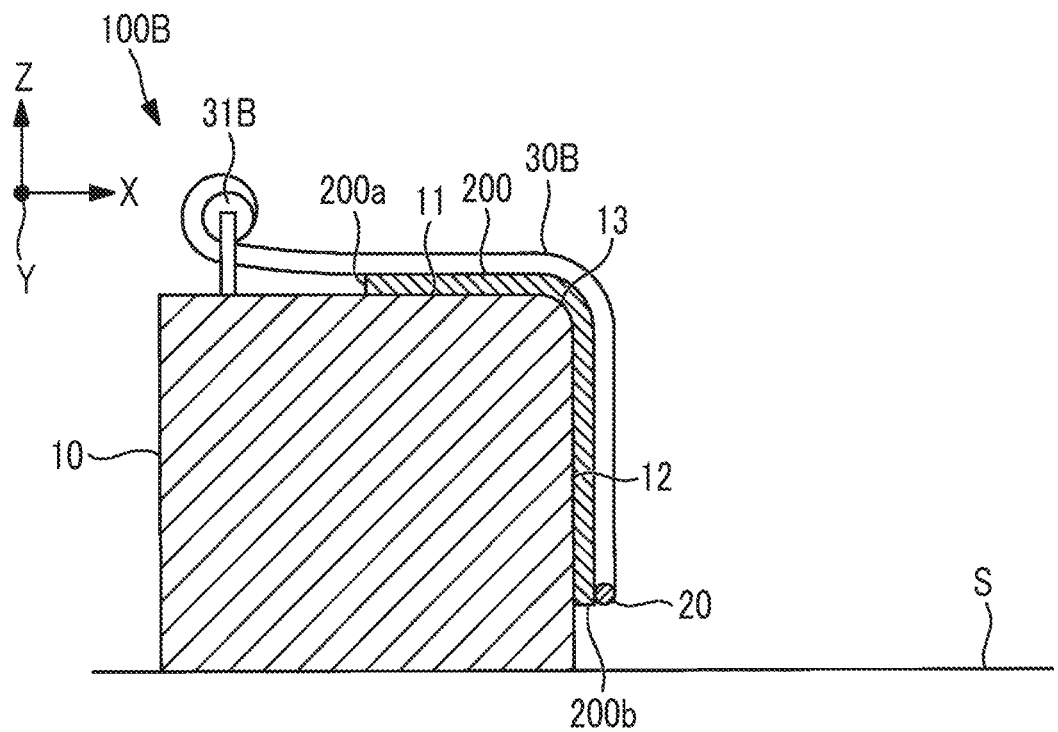
FIG. 12 is a cross-sectional view that shows the forming device according to the third embodiment of the present disclosure and that shows a state where the forming of the laminate is finished.

FIGS. 11 and 12 are cross-sectional views showing the forming device 100B according to the present embodiment. FIG. 11 shows a state during the forming of the laminate 200. FIG. 12 shows a state where the forming of the laminate 200 is finished.

The forming die 10 and the forming jig 20 of the present embodiment are the same as those of the first embodiment. The holding jig 30B of the present embodiment is formed in a sheet-like shape of which one end is wound around the roller 31B and the other end is attached to the forming jig 20. The holding jig 30B is formed of a material having flexibility (for example, silicone, PVC, or FEP) that can be deformed corresponding to the shape of the laminate 200 formed along the surface shape of the curved surface 13.

As with the first embodiment, the forming jig 20 of the present embodiment is moved along the longitudinal direction LD from the one end 200a to the other end 200b of the laminate 200 in the longitudinal direction LD. In addition, the holding jig 30B of the present embodiment is unwound from the roller 31B and is installed to cover the entire laminate 200 including a region formed by the curved surface 13 as the forming jig 20 is moved from the one end 200a of the laminate 200 to the other end 200b.

The holding jig 30B is unwound from the roller 31B in a state where a tension for pressing the laminate 200 against the curved surface 13 is applied. Therefore, a region of the laminate 200 over which the forming jig 20 passes and that is covered by the holding jig 30B is maintained in a state of being pressed against the forming die 10. FIG. 11 shows a state where the forming jig 20 has passed over the curved surface 13 and moves on the side surface 12. When the forming jig 20 moves on the side surface 12 along the Z-axis and reaches the other end 200b of the laminate 200, a state as shown in FIG. 12 is achieved.

According to the forming method of the present embodiment, the sheet-shaped holding jig 30B is unwound from the roller 31B in a state where a tension for pressing the laminate 200 against the curved surface 13 is applied as the forming jig 20 is moved from the one end 200a of the laminate 200 to the other end 200b. By installing the sheet-shaped holding jig 30B on the convex curved surface 13, it is possible to reliably maintain a state where the laminate 200 is formed along the surface shape of the forming die 10.

Fourth Embodiment

Next, a forming device 100C according to a fourth embodiment of the present disclosure and a forming method in which the forming device 100C is used will be described with reference to the drawings.

The present embodiment is a modification example of the first embodiment, is the same as the first embodiment except for a case particularly described below, and the description thereof will be omitted below.

In the first embodiment, the holding jig 30 is moved by the installation mechanism 40 to a position close to the forming die 10 from a position separated from the forming die 10. In contrast, in the present embodiment, a holding jig 30C is unwound from the forming jig 20 as the forming jig 20 moves.

Figure 13:
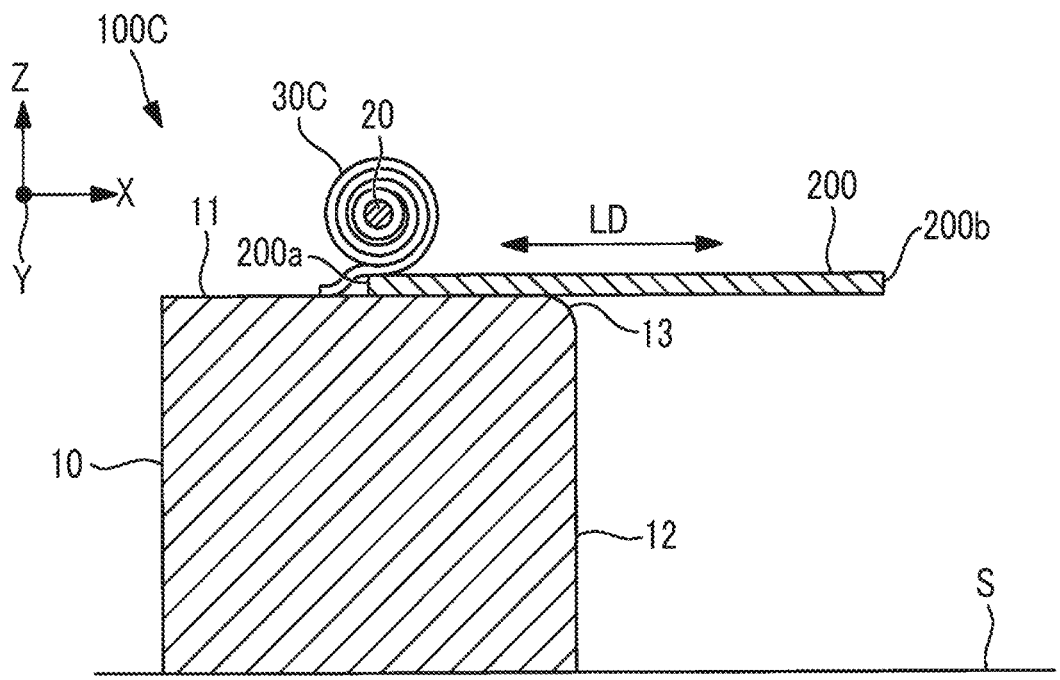
FIG. 13 is a cross-sectional view that shows a forming device according to a fourth embodiment of the present disclosure and that shows a state before the forming of a laminate.
Figure 14:
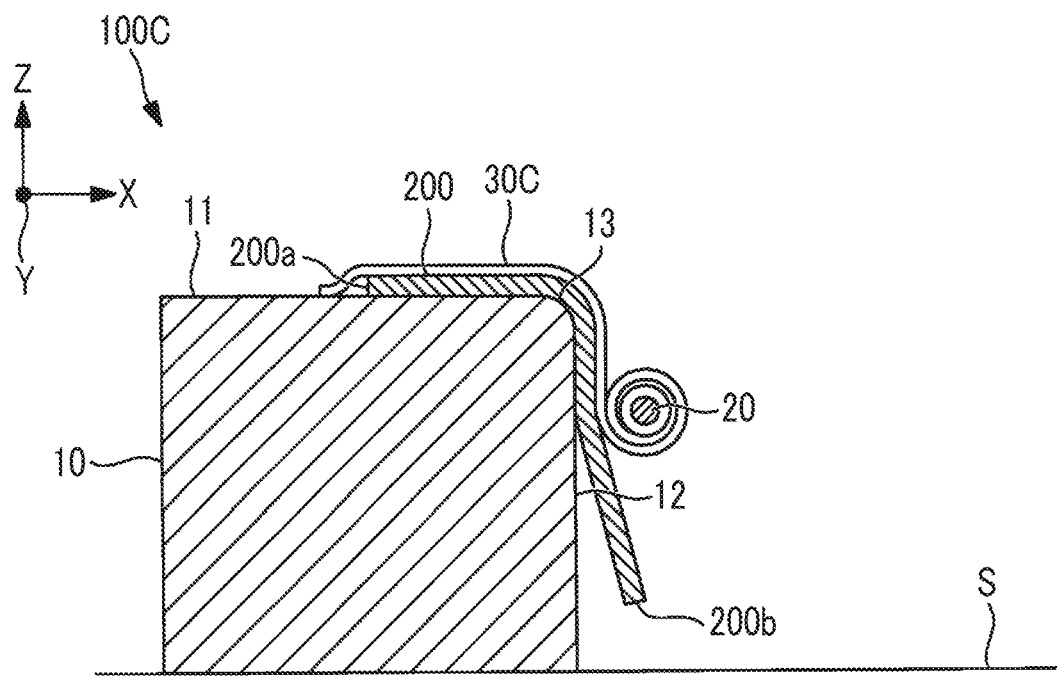
FIG. 14 is a cross-sectional view that shows the forming device according to the fourth embodiment of the present disclosure and that shows a state during the forming of the laminate.
Figure 15:
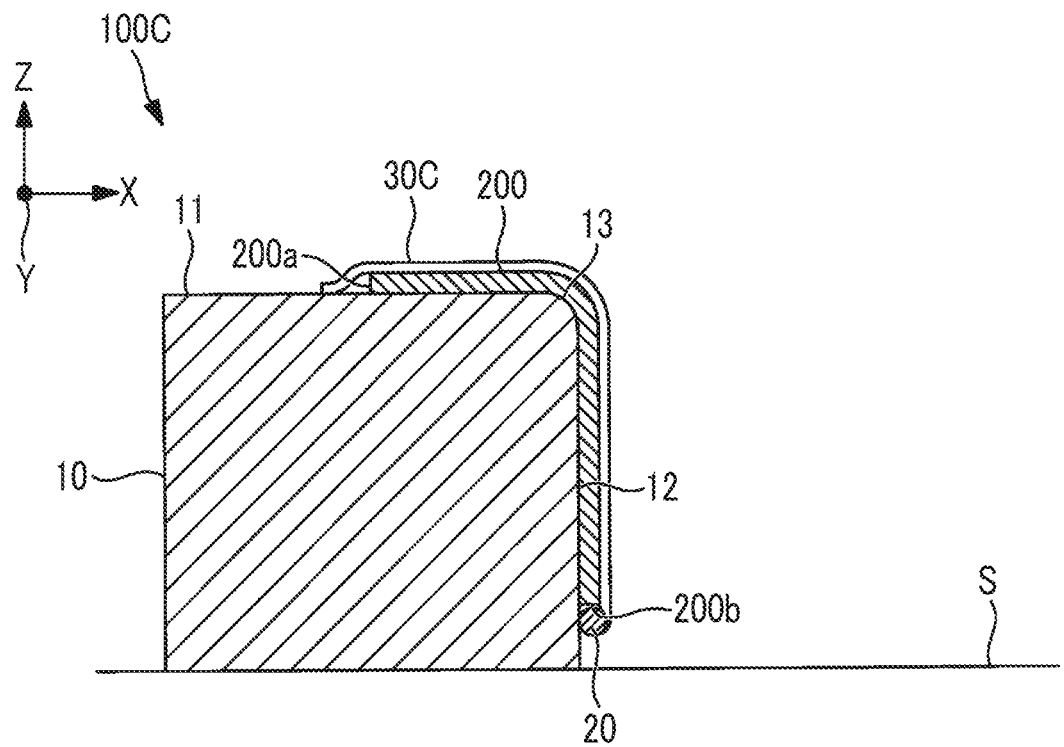
FIG. 15 is a cross-sectional view that shows the forming device according to the fourth embodiment of the present disclosure and that shows a state where the forming of the laminate is finished.

FIGS. 13 to 15 are cross-sectional views showing the forming device 100C according to the present embodiment. FIGS. 13 and 14 show a state during the forming of the laminate 200. FIG. 15 shows a state where the forming of the laminate 200 is finished.

The forming die 10 and the forming jig 20 of the present embodiment are the same as those of the first embodiment. The holding jig 30C of the present embodiment is formed in a sheet-like shape of which one end is fixed to the forming die 10 and the other end is wound around the forming jig 20. The holding jig 30C is formed of a material having flexibility (for example, silicone, PVC, or FEP) that can be deformed corresponding to the shape of the laminate 200 formed along the surface shape of the curved surface 13.

As with the first embodiment, the forming jig 20 of the present embodiment is moved along the longitudinal direction LD from the one end 200a to the other end 200b of the laminate 200 in the longitudinal direction LD. In addition, the holding jig 30C of the present embodiment is unwound from the forming jig 20 and is installed to cover the entire laminate 200 including a region formed by the curved surface 13 as the forming jig 20 is moved from the one end 200a of the laminate 200 to the other end 200b.

FIG. 13 shows a state before the start of a forming step in the present embodiment. FIG. 14 shows a state where the forming jig 20 has passed over the curved surface 13 and moves on the side surface 12. When the forming jig 20 moves on the side surface 12 along the Z-axis and reaches the other end 200b of the laminate 200, a state as shown in FIG. 15 is achieved.

According to the forming method of the present embodiment, by causing the sheet-shaped holding jig 30C wound around the forming jig 20 to be unwound as the forming jig 20 is moved from the one end 200a of the laminate 200 to the other end 200b, it is possible to install the holding jig 30C on the convex curved surface 13 and to reliably maintain a state where the laminate 200 is formed along the surface shape of the forming die 10.

Fifth Embodiment

Next, a forming device 100D according to a fifth embodiment of the present disclosure and a forming method in which the forming device 100D is used will be described with reference to the drawings.

The present embodiment is a modification example of the first embodiment, is the same as the first embodiment except for a case particularly described below, and the description thereof will be omitted below.

In the first embodiment, the holding jig 30 is moved by the installation mechanism 40 to a position close to the forming die 10 from a position separated from the forming die 10. In contrast, in the present embodiment, holding jigs 30D are moved along the longitudinal direction LD of the laminate 200 in a state where the laminate 200 is pressed against the forming die 10 as the forming jig 20 is moved from the one end 200a of the laminate 200 to the other end 200b.

Figure 16:
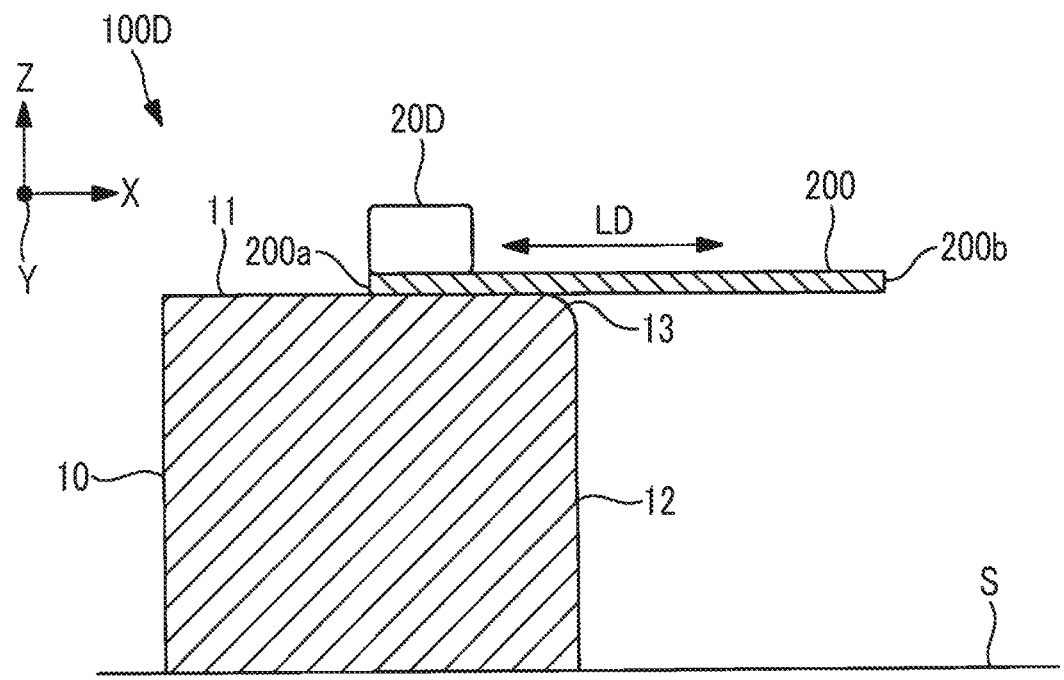
FIG. 16 is a cross-sectional view that shows a forming device according to a fifth embodiment of the present disclosure and that shows a state before the forming of a laminate.
Figure 17:
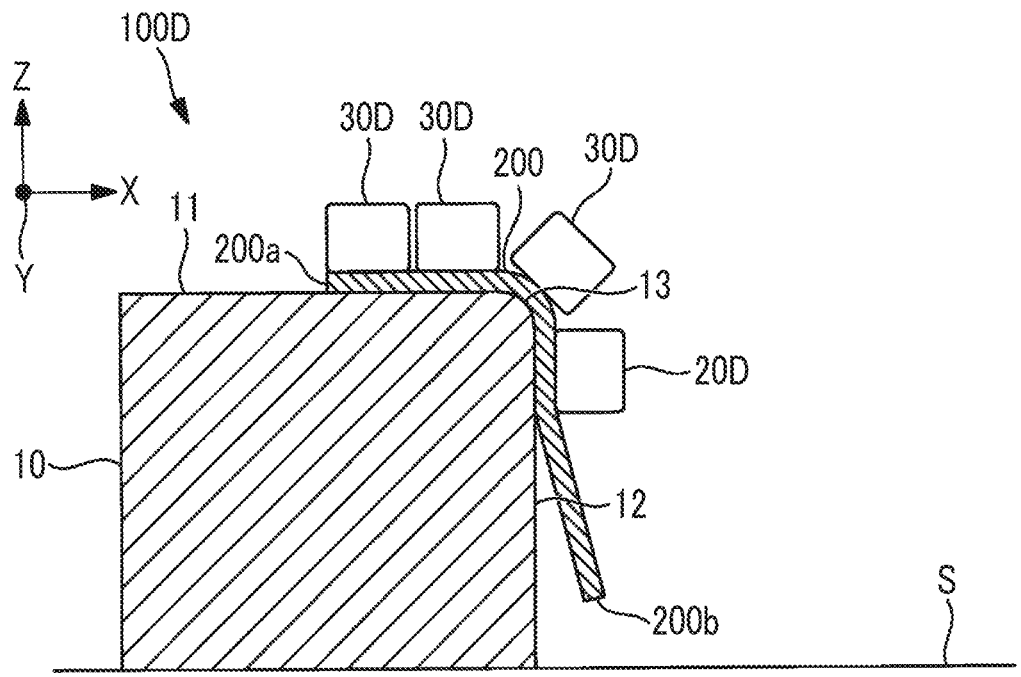
FIG. 17 is a cross-sectional view that shows the forming device according to the fifth embodiment of the present disclosure and that shows a state during the forming of the laminate.
Figure 18:
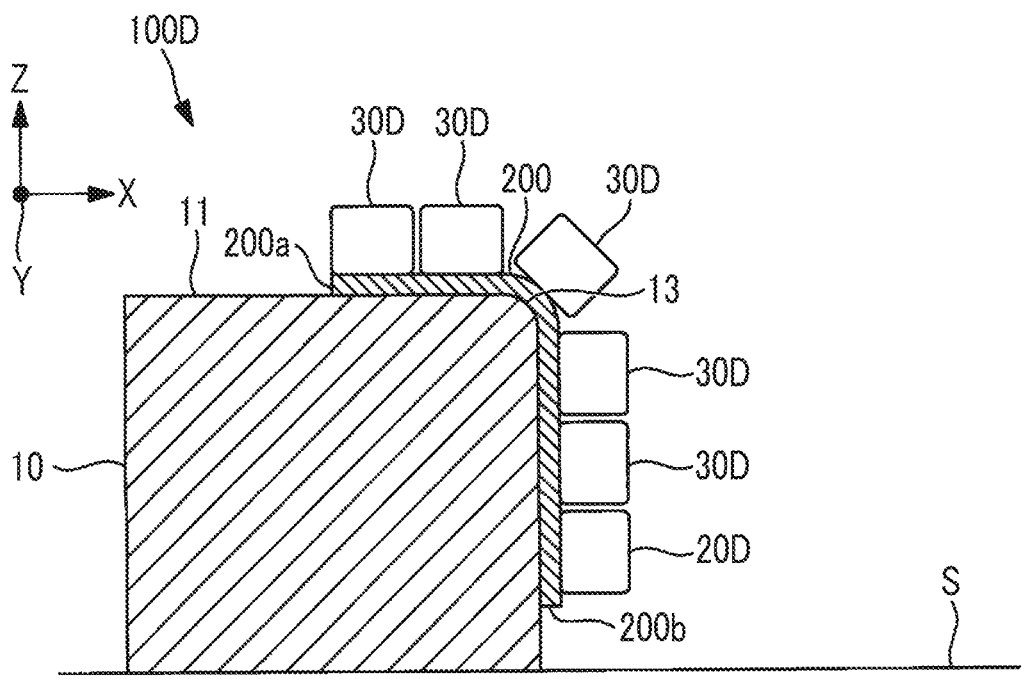
FIG. 18 is a cross-sectional view that shows the forming device according to the fifth embodiment of the present disclosure and that shows a state where the forming of the laminate is finished.

FIGS. 16 to 18 are cross-sectional views showing the forming device 100D according to the present embodiment. FIGS. 16 and 17 show a state during the forming of the laminate 200. FIG. 18 shows a state where the forming of the laminate 200 is finished.

The forming die 10 of the present embodiment is the same as that of the first embodiment. A forming jig 20D of the present embodiment is the same as the forming jig 20 of the first embodiment except that the forming jig 20D has a rectangular cross-sectional shape. That is, the forming jig 20D is a jig formed in a rod-like shape extending in the width direction of the laminate 200. Each holding jig 30D of the present embodiment is formed in a rod-like shape extending in the width direction of the laminate 200 is formed to be rectangular as seen in a cross-sectional view.

As with the first embodiment, the forming jig 20D of the present embodiment is moved along the longitudinal direction LD from the one end 200a to the other end 200b of the laminate 200 in the longitudinal direction LD. In addition, in the present embodiment, a plurality of the holding jigs 30D are moved along the longitudinal direction LD of the laminate 200 in a state where the laminate 200 is pressed against the forming die 10 as the forming jig 20D is moved from the one end 200a of the laminate 200 to the other end 200b. The plurality of holding jigs 30D move along a surface of the laminate 200 in a state being adjacent to the forming jig 20D so that the holding jigs 30D are installed to cover the entire laminate 200 including a region formed by the curved surface 13.

FIG. 16 shows a state before the start of a forming step in the present embodiment. FIG. 17 shows a state where the forming jig 20D has passed over the curved surface 13 and moves on the side surface 12. In a state shown in FIG. 17, the plurality of holding jigs 30D are disposed on a region of the laminate 200 over which the forming jig 20D has passed. When the forming jig 20 moves on the side surface 12 along the Z-axis and reaches the other end 200b of the laminate 200, a state as shown in FIG. 18 is achieved.

According to the forming method of the present configuration, by moving the plurality of rod-shaped holding jigs 30D along the surface shape of the forming die 10 in a state where the laminate 200 is pressed against the forming die 10 as the forming jig 20D is moved from the one end 200a of the laminate 200 to the other end 200b, it is possible to install the holding jigs 30D on the convex curved surface 13 and to reliably maintain a state where the laminate 200 is formed along the surface shape of the forming die 10.

Sixth Embodiment

Next, a forming device 100E according to a sixth embodiment of the present disclosure and a forming method in which the forming device 100E is used will be described with reference to the drawings.

The present embodiment is a modification example of the first embodiment, is the same as the first embodiment except for a case particularly described below, and the description thereof will be omitted below.

The forming jig 20 of the first embodiment is formed in a rod-like shape extending along the width direction of the laminate 200 and is moved from the one end 200a to the other end 200b along the longitudinal direction LD of the laminate 200. In contrast, in the present embodiment, a forming jig 20E is attached to the other end 200b of the laminate 200 and is moved from a position separated from the forming die 10 to a position at which the forming jig 20E comes into contact with the forming die 10.

Figure 19:
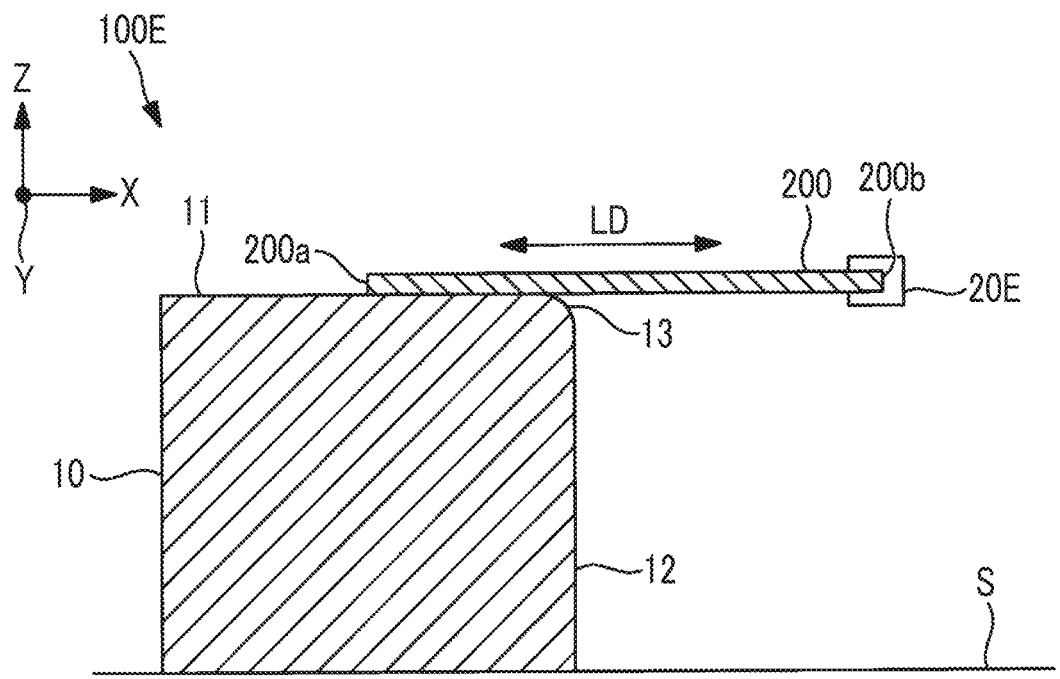
FIG. 19 is a cross-sectional view that shows a forming device according to a sixth embodiment of the present disclosure and that shows a state before the forming of a laminate.
Figure 20:
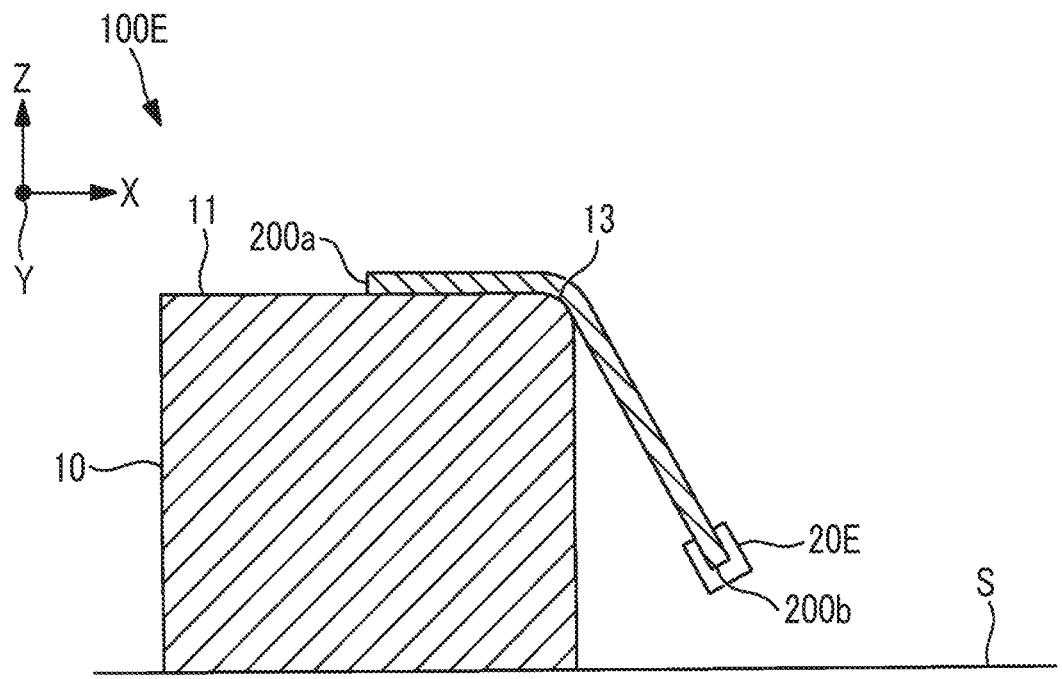
FIG. 20 is a cross-sectional view that shows the forming device according to the sixth embodiment of the present disclosure and that shows a state during the forming of the laminate.

FIGS. 19 to 21 are cross-sectional views showing the forming device 100E according to the present embodiment. FIGS. 19 and 20 show a state during the forming of the laminate 200. FIG. 21 shows a state where the forming of the laminate 200 is finished.

The forming die 10 of the present embodiment is the same as that of the first embodiment. The forming jig 20E of the present embodiment is attached to the other end 200b of the laminate 200 and is formed to extend along the width direction of the laminate 200. In a forming step of the present embodiment, the forming jig 20E is moved from a position (position shown in FIG. 19) separated from the forming die 10 to a position (position shown in FIG. 21) at which the forming jig 20E comes into contact with the forming die 10 in a state where a tension for pressing the laminate 200 against the curved surface 13 is applied.

FIG. 19 shows a state before the start of a forming step in the present embodiment. FIG. 20 shows a state where the forming jig 20E is close to the side surface 12. When the forming jig 20E reaches the side surface 12, a state as shown in FIG. 21 is achieved. When the laminate 200 enters a state of being formed along the surface shape of the forming die 10 as shown in FIG. 21, the first holding jig 31, the second holding jig 32, and the third holding jig 33 are moved to positions close to the forming die 10 from positions separated from the forming die 10 by means of the installation mechanism 40 and each holding jig is installed on a region including the curved surface 13 of the forming die 10.

According to the forming method of the present embodiment, by moving the forming jig 20E attached to the other end 200b of the laminate 200 from a position separated from the forming die 10 to a position at which the forming jig 20E comes into contact with the forming die 10, it is possible to form the laminate 200 along the surface shape of the forming die 10. In addition, by moving the holding jig 30 from a position separated from the forming die 10 to a position close to the forming die 10 in a state where the forming jig 20E presses the laminate 200 against the forming die 10, it is possible to install the holding jig 30 on the convex curved surface 13 and to reliably maintain a state where the laminate 200 is formed along the surface shape of the forming die 10.

Other Embodiments

In the first to fourth embodiments described above, in the forming step, the forming jig 20 is moved along the longitudinal direction LD from the one end 200a to the other end 200b of the laminate 200 in the longitudinal direction LD. However, other configurations may also be adopted. For example, in the forming step, the forming jig 20 may be moved along the longitudinal direction LD from a first region to a second region disposed between the one end 200a and the other end 200b of the laminate 200. That is, the forming step includes not only a step of forming the entire region of the laminate 200 in the longitudinal direction but also a step of forming only a partial region of the laminate 200 in the longitudinal direction.

The forming method described in the embodiment described above is understood as follows, for example.

A forming method according to the present disclosure is a forming method of forming a laminate (200) that is obtained by laminating a plurality of sheet-shaped materials including reinforcing fibers, the forming method including: a fixation step (S101) of fixing a first region (200a) of the laminate in a longitudinal direction (LD) to a forming die (10) that includes a curved portion (13) having at least one of a concave shape and a convex shape along a predetermined direction; a forming step (S103 to S107) of forming the laminate along a surface shape of the forming die by pressing a second region (200b) of the laminate, of which the first region is fixed in the fixation step, in the longitudinal direction against the forming die by means of a forming jig (20); and an installation step (S104 to S106) of installing a holding jig (30) on the curved portion in a state where the forming jig presses the laminate against the forming die, the holding jig maintaining a state where the laminate is pressed against the curved portion.

According to the forming method of the present disclosure, the first region of the laminate in the longitudinal direction is fixed to the forming die including the curved portion having at least one of the concave shape and the convex shape along the predetermined direction and the second region of the laminate in the longitudinal direction is pressed against the forming die so that the laminate is formed along the surface shape of the forming die. The holding jig is installed on the curved portion of the laminate formed along the surface shape of the forming die in a state where the laminate is pressed against the forming die by the forming jig. Since the forming jig is in a state of pressing the laminate against the forming die at the time of installation of the holding jig, the laminate is not deformed into a shape different from the surface shape of the forming die with the forming jig withdrawn from the laminate. Therefore, it is possible to reliably maintain a state where the laminate, which is obtained by laminating a plurality of sheet-shaped materials including reinforcing fibers, is formed along the surface shape of the forming die.

The forming method according to the present disclosure preferably further includes a disposition step (S102) of disposing the forming jig having a rod-like shape extending in a width direction (WD) of the laminate so as to come into contact with the first region of the laminate fixed in the fixation step. In the forming step, the forming jig is preferably moved from the first region to the second region (200b) of the laminate along the predetermined direction in a state where the forming jig disposed in the disposition step presses the laminate against the forming die, and in the installation step, the holding jig is preferably installed on the curved portion over which the forming jig has passed.

According to the forming method of the present configuration, by disposing the forming jig having a rod-like shape extending in the width direction of the laminate so as to come into contact with the first region of the laminate and moving the forming jig from the first region to the second region of the laminate in a state where the forming jig presses the laminate against the forming die, it is possible to form the laminate along the surface shape of the forming die.

In the forming method according to the above-described configuration, the holding jig preferably has a shape corresponding to the curved portion of the forming die, and in the installation step, the holding jig is preferably moved from a position separated from the forming die to a position close to the forming die so that the holding jig is installed on the curved portion.

According to the forming method of the present configuration, by moving the holding jig from a position separated from the forming die to a position close to the forming die, it is possible to install the holding jig on the curved portion and to reliably maintain a state where the laminate is formed along the surface shape of the forming die.

In the forming method according to the above-described configuration, the curved portion is preferably formed in a convex shape along the predetermined direction, the holding jig is preferably formed in a sheet-like shape of which one end is wound around a roller (31A) and the other end is attached to the forming jig, and in the installation step, as the forming jig moves from the first region to the second region of the laminate, the holding jig is preferably unwound from the roller in a state where a tension for pressing the laminate against the curved portion is applied so that the holding jig is installed on the curved portion.

According to the forming method of the present configuration, by causing the sheet-shaped holding jig to be unwound from the roller in a state where a tension for pressing the laminate against the curved portion is applied as the forming jig is moved from the first region to the second region of the laminate, it is possible to install the holding jig on the curved portion and to reliably maintain a state where the laminate is formed along the surface shape of the forming die.

In the forming method according to the above-described configuration, the holding jig is preferably formed in a sheet-like shape of which one end is fixed to the forming die and the other end is wound around the forming jig, and in the installation step, as the forming jig moves from the first region to the second region of the laminate, the holding jig wound around the forming jig is preferably unwound so that the holding jig is installed on the curved portion.

According to the forming method of the present configuration, by causing the sheet-shaped holding jig wound around the forming jig to be unwound as the forming jig is moved from the first region to the second region of the laminate, it is possible to install the holding jig on the curved portion and to reliably maintain a state where the laminate is formed along the surface shape of the forming die.

In the forming method according to the above-described configuration, the holding jig is preferably formed in a rod-like shape extending in the width direction (WD) of the laminate, and in the installation step, as the forming jig moves from the first region to the second region of the laminate, a plurality of the holding jigs are preferably moved along the predetermined direction in a state where the laminate is pressed against the forming die so that the holding jigs are installed on the curved portion.

According to the forming method of the present configuration, by moving the plurality of rod-shaped holding jigs along the predetermined direction in a state where the laminate is pressed against the forming die as the forming jig is moved from the first region to the second region of the laminate, it is possible to install the holding jigs on the curved portion and to reliably maintain a state where the laminate is formed along the surface shape of the forming die.

In the forming method according to the present disclosure, the forming jig is preferably attached to the second region of the laminate, the holding jig preferably has a shape corresponding to the curved portion of the forming die, in the forming step, the forming jig is preferably moved from a position separated from the forming die to a position at which the forming jig comes into contact with the forming die in a state where a tension for pressing the laminate against the curved portion is applied, and in the installation step, the holding jig is preferably moved from a position separated from the forming die to a position close to the forming die so that the holding jig is installed on the curved portion.

According to the forming method of the present configuration, by moving the forming jig attached to the second region of the laminate from a position separated from the forming die to a position at which the forming jig comes into contact with the forming die, it is possible to form the laminate along the surface shape of the forming die. In addition, by moving the holding jig from a position separated from the forming die to a position close to the forming die in a state where the forming jig presses the laminate against the forming die, it is possible to install the holding jig on the curved portion and to reliably maintain a state where the laminate is formed along the surface shape of the forming die.

The forming device described in each embodiment described above is understood as follows, for example.

A forming device according to the present disclosure is a forming device forming a laminate that is obtained by laminating a plurality of sheet-shaped materials including reinforcing fibers, the forming device including: a forming die that includes a curved portion having at least one of a concave shape and a convex shape along a predetermined direction and to which a first region of the laminate in a longitudinal direction is fixed; a forming jig that forms the laminate along a surface shape of the forming die by pressing a second region of the laminate, of which the first region is fixed to the forming die, in the longitudinal direction against the forming die; a holding jig that maintains a state where the laminate is pressed against the curved portion; and an installation mechanism (40) that installs the holding jig on the curved portion in a state where the forming jig presses the laminate against the forming die.

According to the forming device of the present disclosure, the first region of the laminate in the longitudinal direction is fixed to the forming die including the curved portion having at least one of the concave shape and the convex shape along the predetermined direction and the second region of the laminate in the longitudinal direction is pressed against the forming die so that the laminate is formed along the surface shape of the forming die. The holding jig is installed on the curved portion of the laminate formed along the surface shape of the forming die in a state where the laminate is pressed against the forming die by the forming jig. Since the forming jig is in a state of pressing the laminate against the forming die at the time of installation of the holding jig, the laminate is not deformed into a shape different from the surface shape of the forming die with the forming jig withdrawn from the laminate. Therefore, it is possible to reliably maintain a state where the laminate, which is obtained by laminating a plurality of sheet-shaped materials including reinforcing fibers, is formed along the surface shape of the forming die.

REFERENCE SIGNS LIST

10, 10A: Forming die
11: Upper surface
12: Side surface
13, 16: Curved surface (curved portion)
14: Vertical surface
15: Horizontal surface
20, 20D, 20E: Forming jig
30, 30A, 30B, 30C, 30D: Holding jig
31, 31A: First holding jig
31B: Roller
32, 32A: Second holding jig
33, 33A: Third holding jig
40, 40A: Installation mechanism
41, 41A: First installation unit
42, 42A: Second installation unit
43, 43A: Third installation unit
100, 100A, 100B, 100C, 100D, 100E: Forming device
200: Laminate
200a: One end (first region)
200b: Other end (second region)
LD: longitudinal direction
S: Installation surface

The invention claimed is:

1. A forming method of forming a laminate that is obtained by laminating a plurality of sheet-shaped materials including reinforcing fibers, the forming method comprising:
   a fixation step of fixing a first end of the laminate in a longitudinal direction to a forming die that includes a curved portion having at least one of a concave shape and a convex shape along a predetermined direction;

a disposition step of disposing a forming jig having a rod shape extending in a width direction of the laminate so as to come into contact with the first end of the laminate fixed in the fixation step;

a forming step of forming the laminate along a surface shape of the forming die by moving the forming jig from the first end of the laminate to a second end of the laminate along the predetermined direction in a state where the forming jig disposed in the disposition step presses the laminate against the forming die; and an installation step of installing a holding jig on the forming die over which the forming jig has passed, the holding jig maintaining a state where the laminate is pressed against the curved portion, wherein the holding jig includes a first holding member and a second holding member, the first holding member having a shape that corresponds to the curved portion of the forming die, the second holding member having a shape that corresponds to a flat surface of the forming die, the flat surface being connected to the curved portion of the forming die, in the installation step,
the first holding member is moved from a position separated from the forming die to a position close to the forming die so that the first holding member that maintains a state where the laminate is pressed against the curved portion is installed on the curved portion as the forming jig passes over the curved portion and the laminate contacts with the curved portion, and the second holding member is moved from a position separated from the forming die to a position close to the forming die so that the second holding member that maintains a state where the laminate is pressed against the flat surface is installed on the flat surface as the forming jig passes over a position on the flat surface that faces the second holding member and the laminate contacts with the position on the flat surface, and in the forming step,
the forming jig reaches to the second end after the first holding member is pressed against the curved portion and the second holding member is pressed against the flat surface in the installation process.

2. The forming method according to claim 1, wherein
a shape of the holding jig includes at least one of a concave shape or a convex shape along the width direction of the laminate, and
the forming jig has a shape divided into a plurality of parts along the width direction of the laminate.

3. The forming method according to claim 1, wherein
the curved portion is a portion having the concave shape along the predetermined direction.

* * * * *